(12) United States Patent
Miletta et al.

(10) Patent No.: US 11,161,384 B2
(45) Date of Patent: Nov. 2, 2021

(54) DUAL HYDRAULIC TANK ADJUSTER

(71) Applicant: Harley-Davidson Motor Company Group, LLC, Milwaukee, WI (US)

(72) Inventors: Bryan Miletta, Pleasant Prairie, WI (US); Jeremy Michael Lenzendorf, West Bend, WI (US); Mark Hutchison, New Berlin, WI (US)

(73) Assignees: Harley-Davidson Motor Company Group, LLC, Milwaukee, WI (US); American Showa Incorporated, Sunbury, OH (US)

( * ) Notice: Subject to any disclaimer, the term of this patent is extended or adjusted under 35 U.S.C. 154(b) by 116 days.

(21) Appl. No.: 16/542,552

(22) Filed: Aug. 16, 2019

(65) Prior Publication Data
US 2020/0055364 A1    Feb. 20, 2020

Related U.S. Application Data

(60) Provisional application No. 62/719,797, filed on Aug. 20, 2018.

(51) Int. Cl.
*B60G 17/04*  (2006.01)
*B60G 17/033*  (2006.01)
*B62K 25/08*  (2006.01)

(52) U.S. Cl.
CPC ....... *B60G 17/0416* (2013.01); *B60G 17/033* (2013.01); *B60G 2300/12* (2013.01); *B62K 25/08* (2013.01); *B62K 2201/08* (2013.01)

(58) Field of Classification Search
CPC .............. B60G 17/0416; B60G 17/033; B60G 2300/12; B60G 2300/122; B62K 2201/08;
(Continued)

(56) References Cited

U.S. PATENT DOCUMENTS 3,895,816 A * 7/1975 Takahashi .......... B60G 17/0152
                                              280/5.503
4,815,758 A * 3/1989 Yoshida ............. B60G 17/0155
                                              152/416
(Continued)

FOREIGN PATENT DOCUMENTS

GB    2238990 A  *  6/1991  .......... B60G 17/033
JP   58118408 A  *  7/1983  ............. B60G 17/04
(Continued)

OTHER PUBLICATIONS

Description of GB-2238990 (Year: 1991).*

*Primary Examiner* — James A English
*Assistant Examiner* — Kurtis Nielson
(74) *Attorney, Agent, or Firm* — Michael Best & Friedrich LLP

(57) ABSTRACT

A hydraulic flow adjuster includes a first hydraulic tank, a second hydraulic tank, and a piston actuator. A first piston operates within the first hydraulic tank and a second piston operates within the second hydraulic tank. The piston actuator adjusts a relative position of the first piston in the first hydraulic tank and a relative position of the second piston position in the second hydraulic tank, such that the relative position of the first piston in the first hydraulic tank is the same as the relative position of the second piston in the second hydraulic tank.

18 Claims, 11 Drawing Sheets

(58) Field of Classification Search
CPC .. B62K 2206/41; B62K 2025/048; F16F 9/56
See application file for complete search history.

(56) References Cited

U.S. PATENT DOCUMENTS

| | | | | |
|---|---|---|---|---|
| 5,348,112 | A * | 9/1994 | Vaillancourt | B62K 25/10 |
| | | | | 180/227 |
| 5,486,018 | A * | 1/1996 | Sakai | B60G 17/0416 |
| | | | | 280/124.16 |
| 5,547,211 | A * | 8/1996 | Runkel | B60G 11/30 |
| | | | | 267/64.15 |
| 6,520,524 | B1 * | 2/2003 | Costa | B60G 17/0416 |
| | | | | 280/276 |
| 9,186,949 | B2 * | 11/2015 | Galasso | B60G 11/27 |
| 2002/0033094 | A1 * | 3/2002 | Sawai | F16F 9/064 |
| | | | | 92/261 |
| 2006/0049013 | A1 * | 3/2006 | Jung | F16F 9/3405 |
| | | | | 188/266.4 |
| 2006/0151270 | A1 * | 7/2006 | Sakai | B60G 17/0416 |
| | | | | 188/313 |
| 2015/0054234 | A1 * | 2/2015 | Marble | B60G 17/08 |
| | | | | 280/6.157 |

FOREIGN PATENT DOCUMENTS

| | | | | |
|---|---|---|---|---|
| JP | 2007203934 A | * | 8/2007 | |
| WO | WO-2019021491 A1 | * | 1/2019 | ......... B60G 17/0565 |

* cited by examiner

DUAL HYDRAULIC TANK ADJUSTER

CROSS-REFERENCE TO RELATED APPLICATIONS

The present application is related to U.S. Provisional Patent Application No. 62/719,797, filed Aug. 20, 2018, the entire contents of which are hereby incorporated by reference.

TECHNICAL FIELD

The present disclosure relates to a vehicle suspension systems. In particular, the disclosure relates to suspension systems including hydraulic tanks.

INTRODUCTION

Vehicle suspension systems can adjust an amount of preload in shock absorbing components. Various suspension system implementations utilize air or hydraulic fluids. Adjusting an amount of preload in shock components can change a vehicle's ride height and suspension characteristics. Some users may adjust the amount of preload based on expected rider weight and/or ballast weight.

SUMMARY

In one aspect, a hydraulic flow adjuster is disclosed. An example hydraulic flow adjuster includes a first hydraulic tank including a first fluid outlet, a first piston arranged to operate within the first hydraulic tank, a second hydraulic tank including a second fluid outlet, a second piston arranged to operate within the second hydraulic tank, and a piston actuator. The piston actuator adjusts a relative position of the first piston in the first hydraulic tank and a relative position of the second piston in the second hydraulic tank, such that a relative position of the first piston in the first hydraulic tank is the same as the relative position of the second piston in the second hydraulic tank.

In another aspect, a suspension system is disclosed. The suspension system includes a hydraulic flow adjuster, a first suspension damper and a second suspension damper. The hydraulic flow adjuster includes a first hydraulic tank including a first fluid outlet, a first piston arranged to operate within the first hydraulic tank, a second hydraulic tank including a second fluid outlet, a second piston arranged to operate within the second hydraulic tank, and a piston actuator. The piston actuator adjusts a relative position of the first piston in the first hydraulic tank and a relative position of the second piston in the second hydraulic tank, such that a relative position of the first piston in the first hydraulic tank is the same as the relative position of the second piston in the second hydraulic tank. The first suspension damper includes a first preload jack that is in fluid communication with the first fluid outlet. The second suspension damper includes a second preload jack that is in fluid communication with the second fluid outlet.

In yet another aspect, a vehicle is disclosed. The vehicle includes a left suspension damper having a left preload jack, a right suspension damper having a right preload jack, and a hydraulic flow adjuster. The hydraulic flow adjuster includes a first hydraulic tank, a first piston, a second hydraulic tank, a second piston, and a piston actuator. The first piston includes a first fluid outlet, where the first fluid outlet is in fluid communication with the left preload jack. The first piston is arranged to operate within the first hydraulic tank. The second hydraulic tank includes a second fluid outlet, where the second fluid outlet is in fluid communication with the right preload jack. The second piston is arranged to operate within the second hydraulic tank. The piston actuator adjusts a relative position of the piston in the first hydraulic tank and a relative position of the second piston in the second hydraulic tank, such that a relative position of the first piston in the first hydraulic tank is the same as the relative position of the second piston in the second hydraulic tank.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
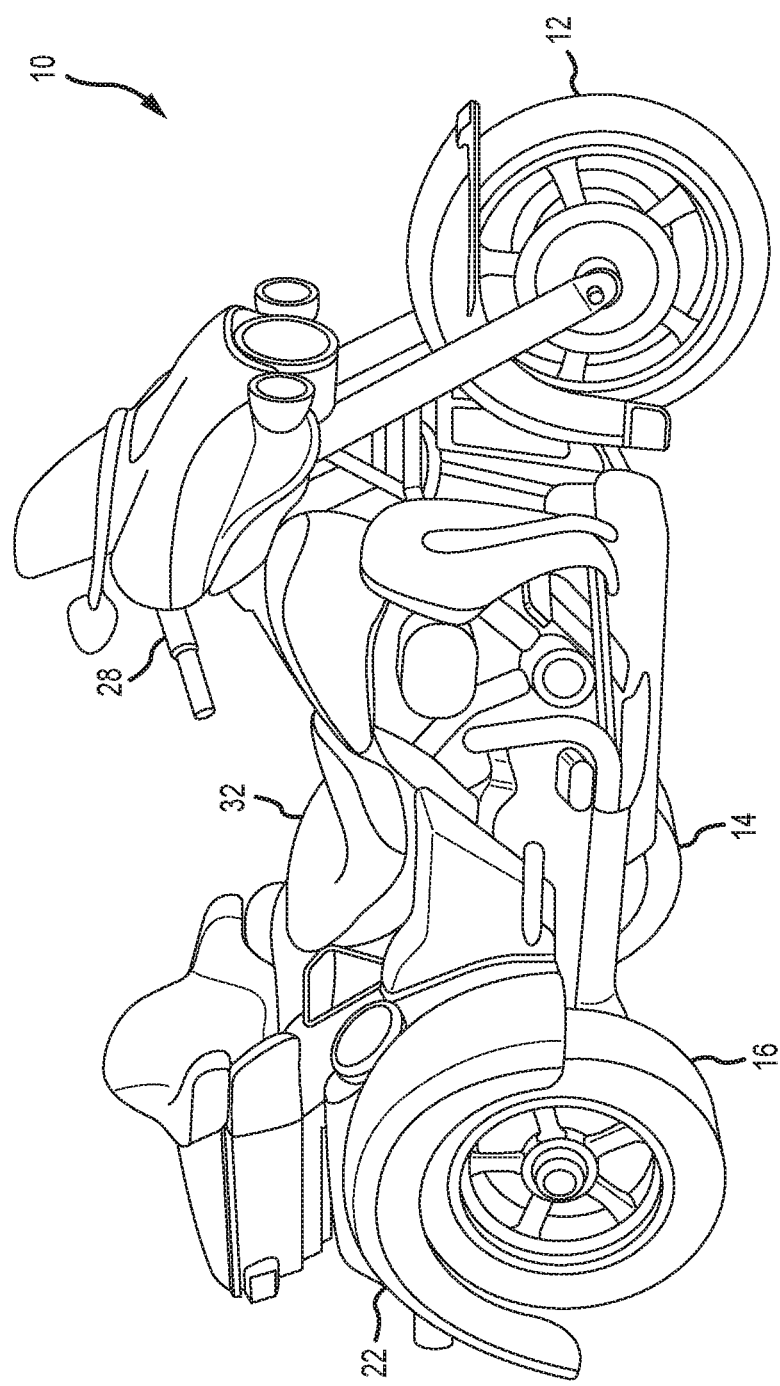
FIG. 1 is a perspective view of an example vehicle.

FIG. 1 illustrates a vehicle in the form of a trike 10 including front wheel 12 and rear wheels 14, 16 coupled to a frame 22. A suspension system interfaces between wheels 14, 16 and frame 22 and provides shock absorption and weight support, among other attributes. A steering assembly 28 including handlebars provided for grasping by the operator is directly coupled to fork tubes 24 for steering front wheel 12. One or both rear wheels 14, 16 receive power from one or more power sources of a drive train to propel the trike 10. At least one straddle seat 32 is provided at an exposed upper surface of trike 10 for supporting a rider, and optionally a passenger. Although shown as a trike 10 with an open cockpit and no surrounding body, aspects of the instant disclosure may be provided in alternate styles of vehicles including different styles of two-wheeled vehicles, on or off-road vehicles having more than two wheels, and vehicles that partially or fully encapsulate the operator.

Figure 2:
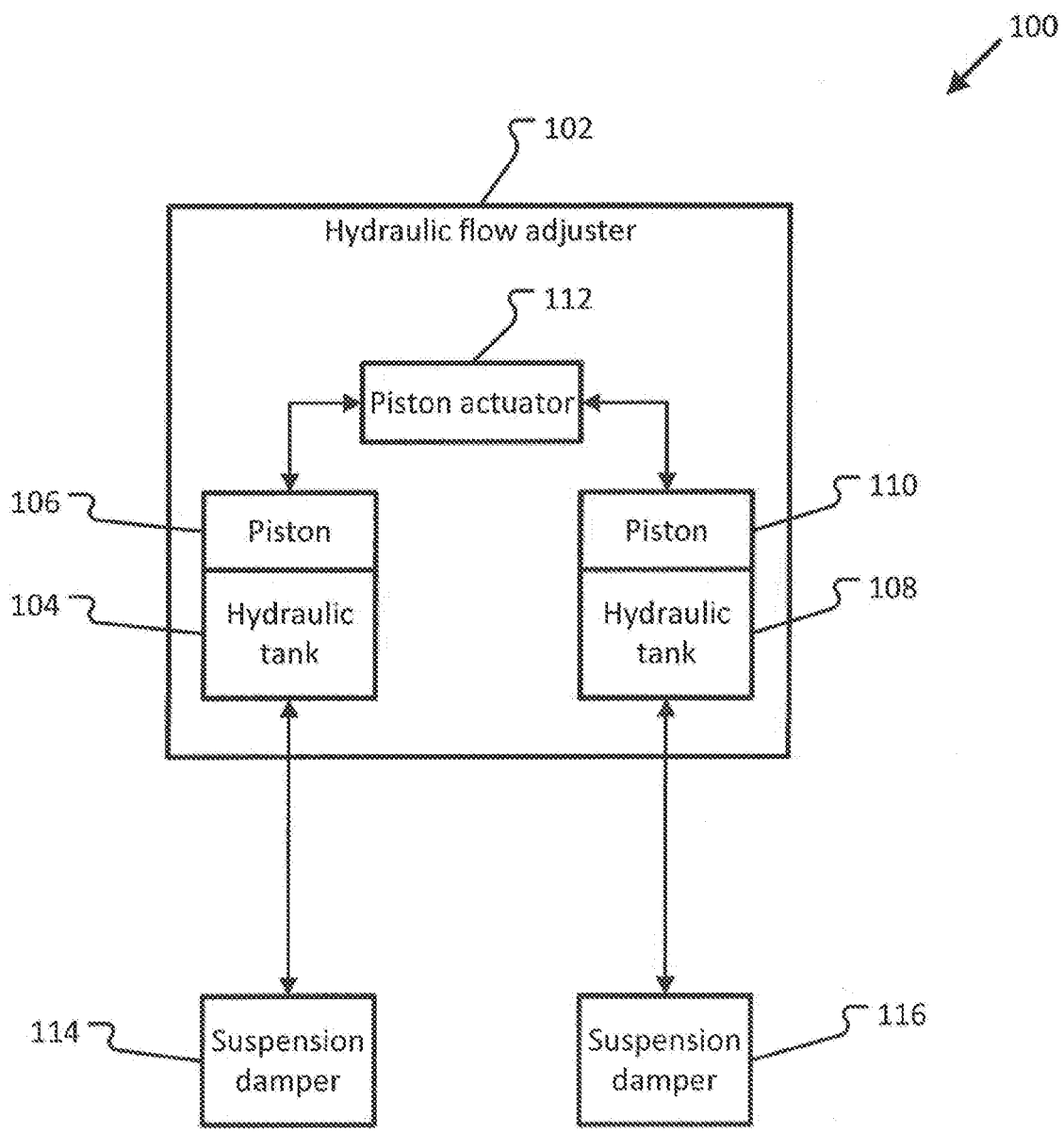
FIG. 2 is a schematic diagram of an example suspension system.

FIG. 2 is a schematic diagram of example suspension system 100. Suspension system 100 includes hydraulic flow adjuster 102, suspension damper 114 and suspension damper 116. Hydraulic flow adjuster 102 includes hydraulic tank 104, piston 106, hydraulic tank 108, piston 110, and piston actuator 112. Suspension system 100 can be implemented on a variety of vehicles, such as two wheeled vehicles, three wheeled vehicles, four wheeled vehicles, and the like. Suspension system 100 is a dual hydraulic circuit, where hydraulic tank 104 is in fluid communication with suspension damper 114, and hydraulic tank 108 is in fluid communication with suspension damper 116. Other embodiments can include more or fewer components.

Hydraulic flow adjuster 102 provides equal preload adjustments at suspension damper 114 and suspension damper 116. Hydraulic flow adjuster 102 can be manually actuated by, for instance, a rider or a service person associated with the vehicle. Hydraulic flow adjuster 102 enables a rider to adjust for total rider weight and or ballast. As more weight is added to the vehicle, springs in the suspension system compress more easily. Changing an amount of pre-load in the suspension system enables the suspension to accommodate for increased or decreased rider weight or ballast.

Hydraulic flow adjuster 102 includes two separate hydraulic tanks: hydraulic tank 104 and hydraulic tank 108. Piston actuator 112 communicates with the pistons in each hydraulic tank, namely, piston 106 and piston 110. As piston actuator 112 is adjusted, piston 106 has a relative position in hydraulic tank 104 that is the same as a relative position of piston 110 in hydraulic tank 108. In various implementations, piston actuator 112 can be manually or automatically adjusted.

Hydraulic tank 104 and hydraulic tank 108 contain, in separate circuits, hydraulic fluid that can flow to suspension damper 114 and suspension damper 116, respectively. Broadly speaking, pistons 106 and 110 determine an amount of hydraulic fluid/pressure in suspension damper 114 and 116, respectively. Usually, hydraulic tank 104 is the same or similarly sized as hydraulic tank 108.

Suspension damper 114 and suspension damper 116 are part of the vehicle's suspension system and, generally, provide shock absorption and other vehicle support functions. Typically, suspension damper 114 and suspension damper 116 are secured to different wheels on the vehicle. In some instances, however, suspension damper 114 and suspension damper 116 are secured to the same wheel. Each suspension damper 114, 116 connects to a wheel assembly on one end and connects to a body or vehicle chassis on an opposing end.

Figure 3:
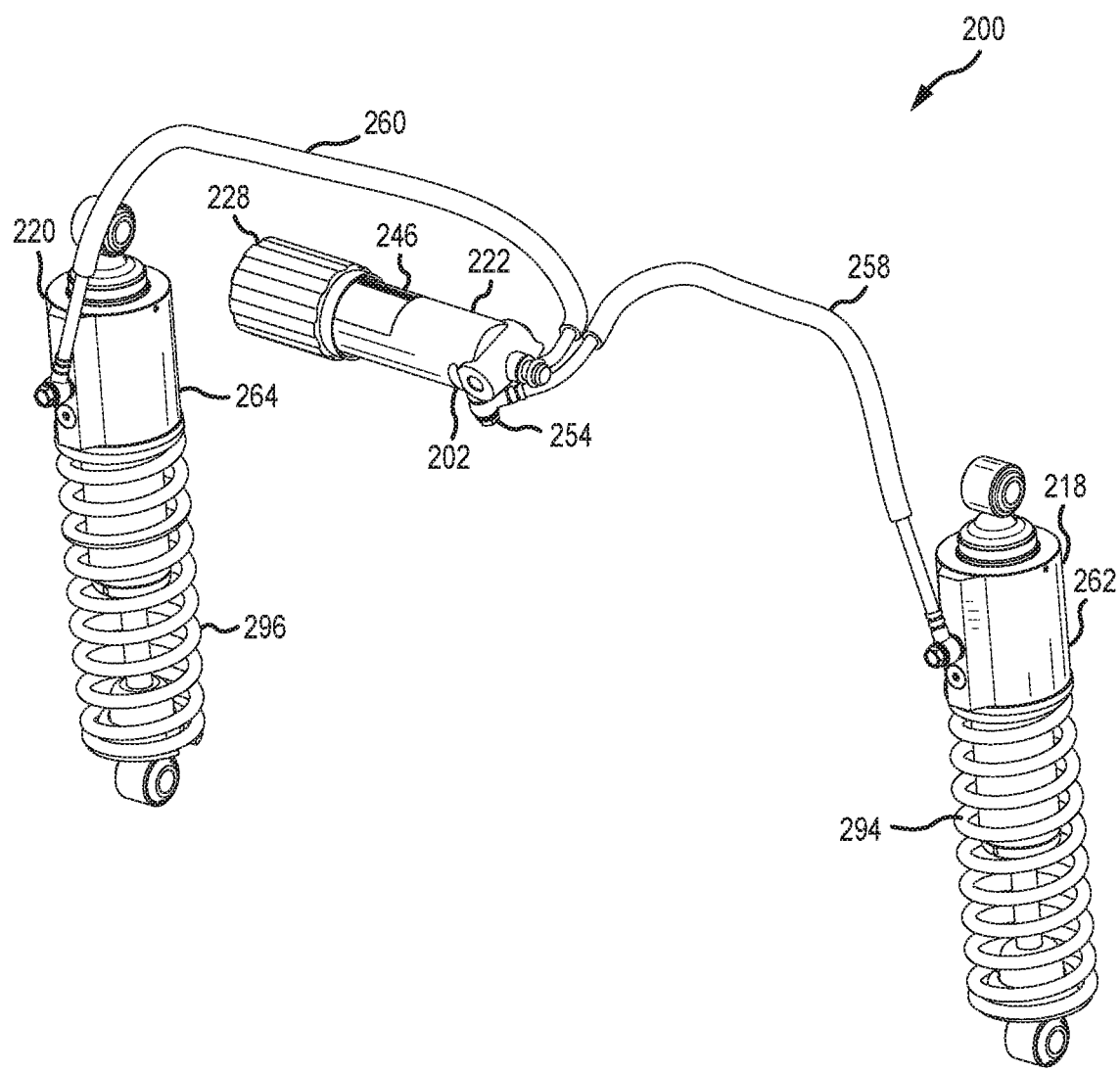
FIG. 3 is a perspective view of an embodiment of the example suspension system shown in FIG. 2.
Figure 4A:
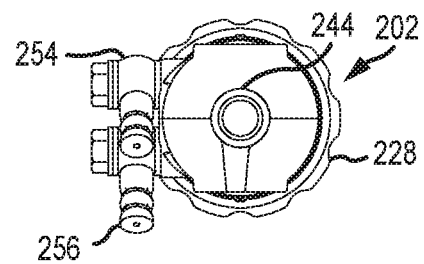
FIG. 4A is a top view of a hydraulic flow adjuster used in the suspension system of FIG. 3.
Figure 4B:
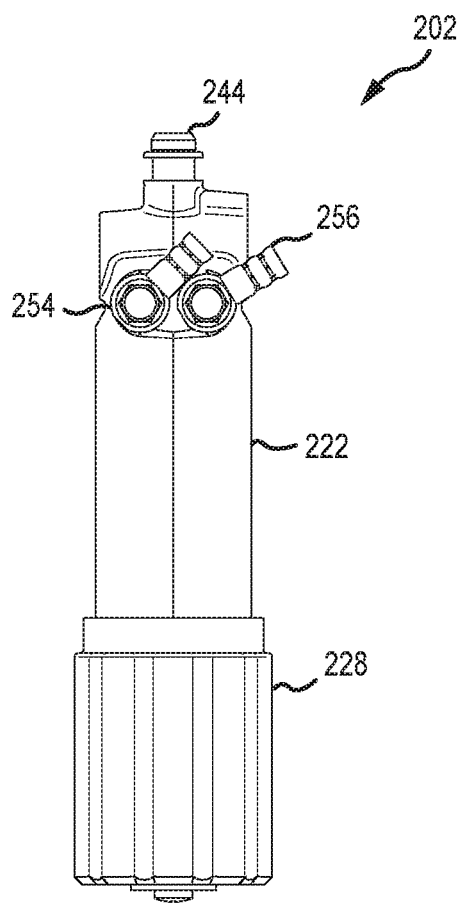
FIG. 4B is a rear plan view of the hydraulic flow adjuster shown in FIG. 3.
Figure 4C:
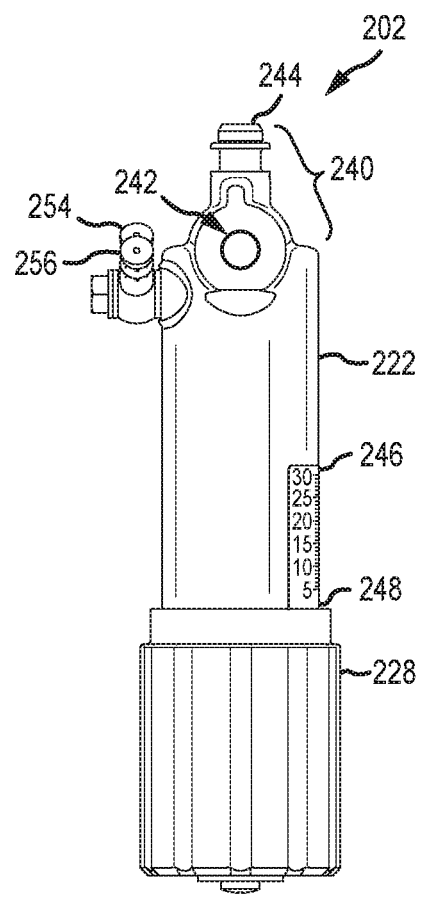
FIG. 4C is a left plan view of the hydraulic flow adjuster shown in FIG. 3.
Figure 4D:
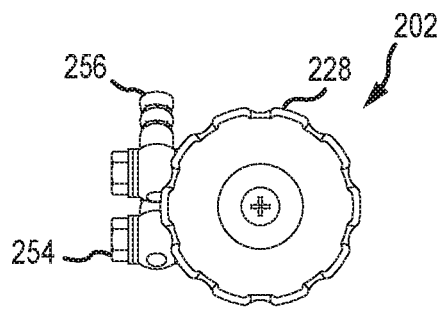
FIG. 4D is a bottom plan view of the hydraulic flow adjuster shown in FIG. 3.
Figure 4E:
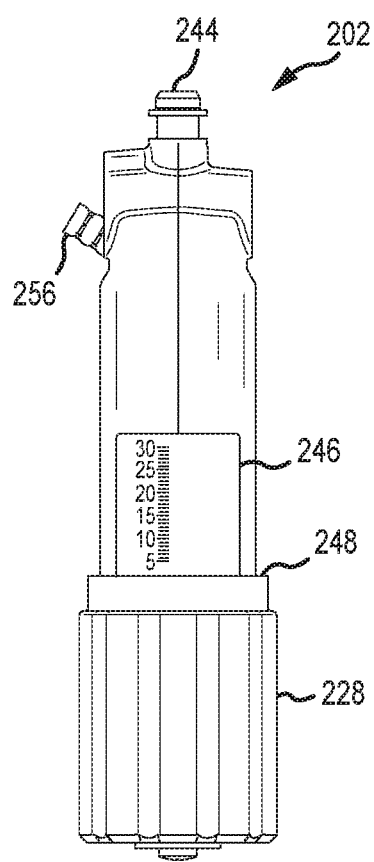
FIG. 4E is a front plan view of the hydraulic flow adjuster shown in FIG. 3.
Figure 4F:
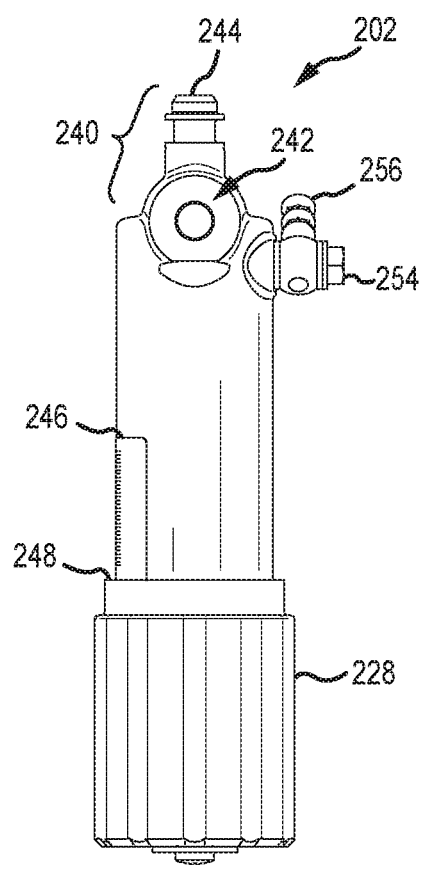
FIG. 4F is a left plan view of the hydraulic flow adjuster shown in FIG. 3.

FIG. 3 is a perspective view of an embodiment of example suspension system 200. Suspension system 200 includes hydraulic flow adjuster 202, suspension damper 218, and suspension damper 220. Suspension system 200 is arranged and configured for manual adjustment of pre-load to suspension damper 218 and suspension damper 220. Hydraulic flow adjuster 202 can be positioned in a variety of locations on a vehicle, such as under a saddle seat on a two- or three-wheeled vehicle. Other locations of hydraulic flow adjuster 202 are contemplated.

Figure 5A:
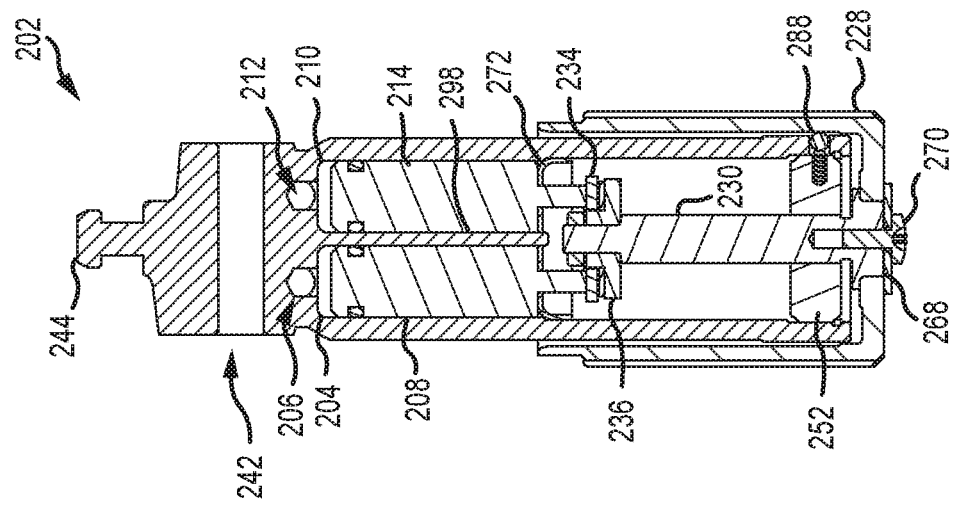
FIG. 5A shows a side sectional view of the hydraulic flow adjuster shown in FIG. 3 in a first actuated position.
Figure 5B:
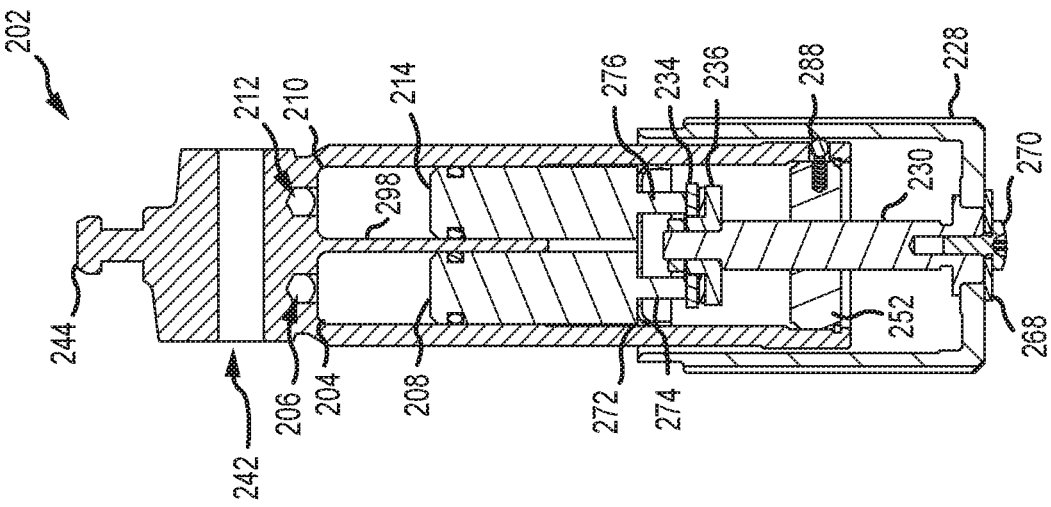
FIG. 5B shows a side sectional view of the hydraulic flow adjuster shown in FIG. 3 in a second actuated position.
Figure 5C:
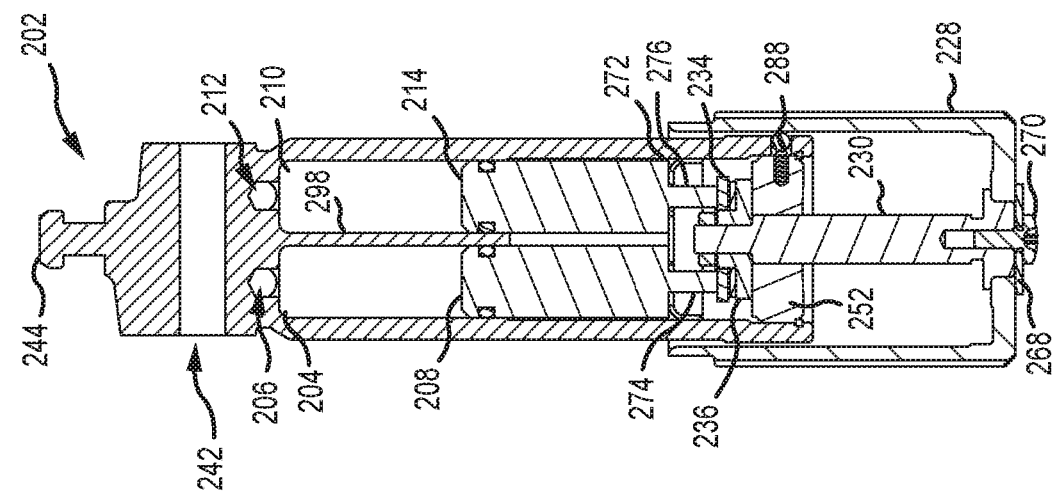
FIG. 5C shows a side sectional view of the hydraulic flow adjuster shown in FIG. 3 in a third actuated position.
Figure 6:
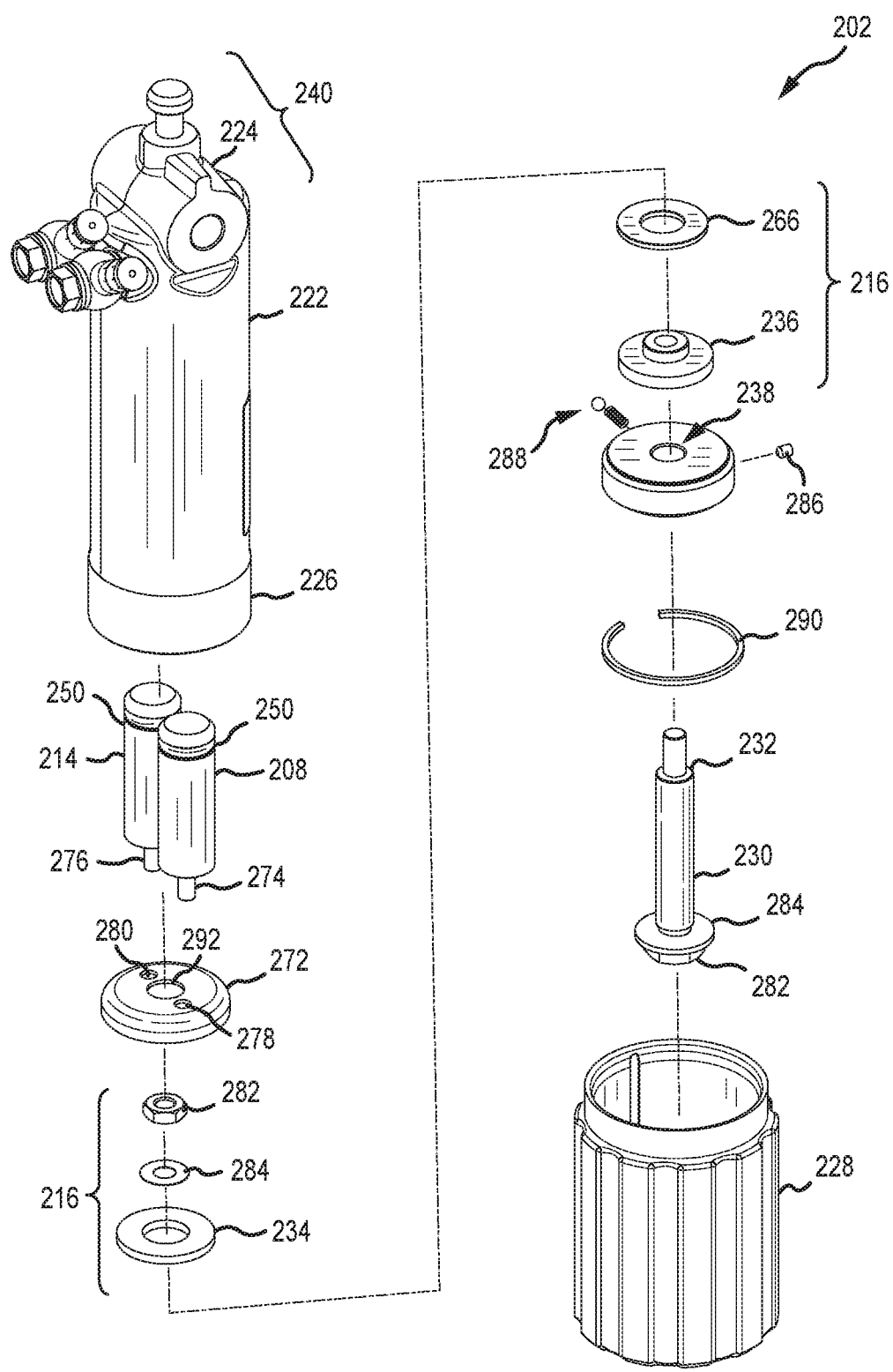
FIG. 6 shows an exploded prospective view of the hydraulic flow adjuster shown in FIG. 3.
Figure 7:
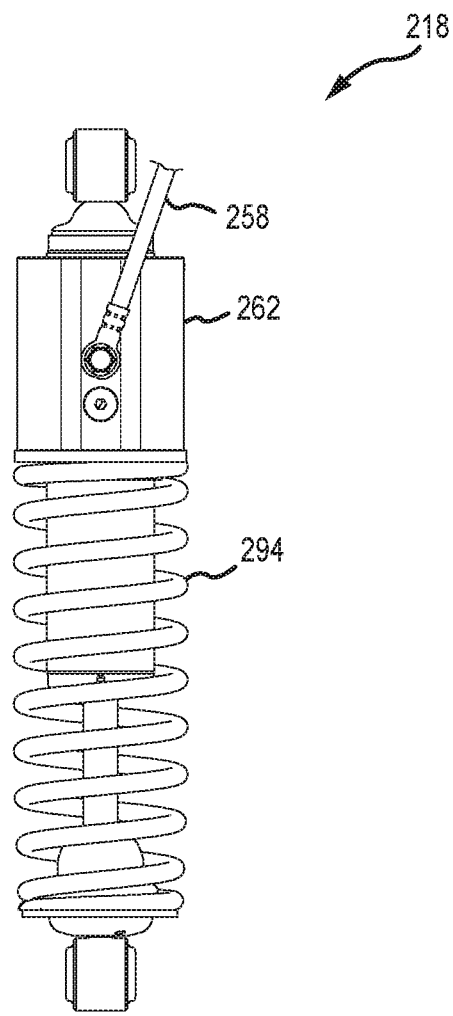
FIG. 7 shows a front plan view of a suspension damper shown in FIG. 3.
Figure 8:
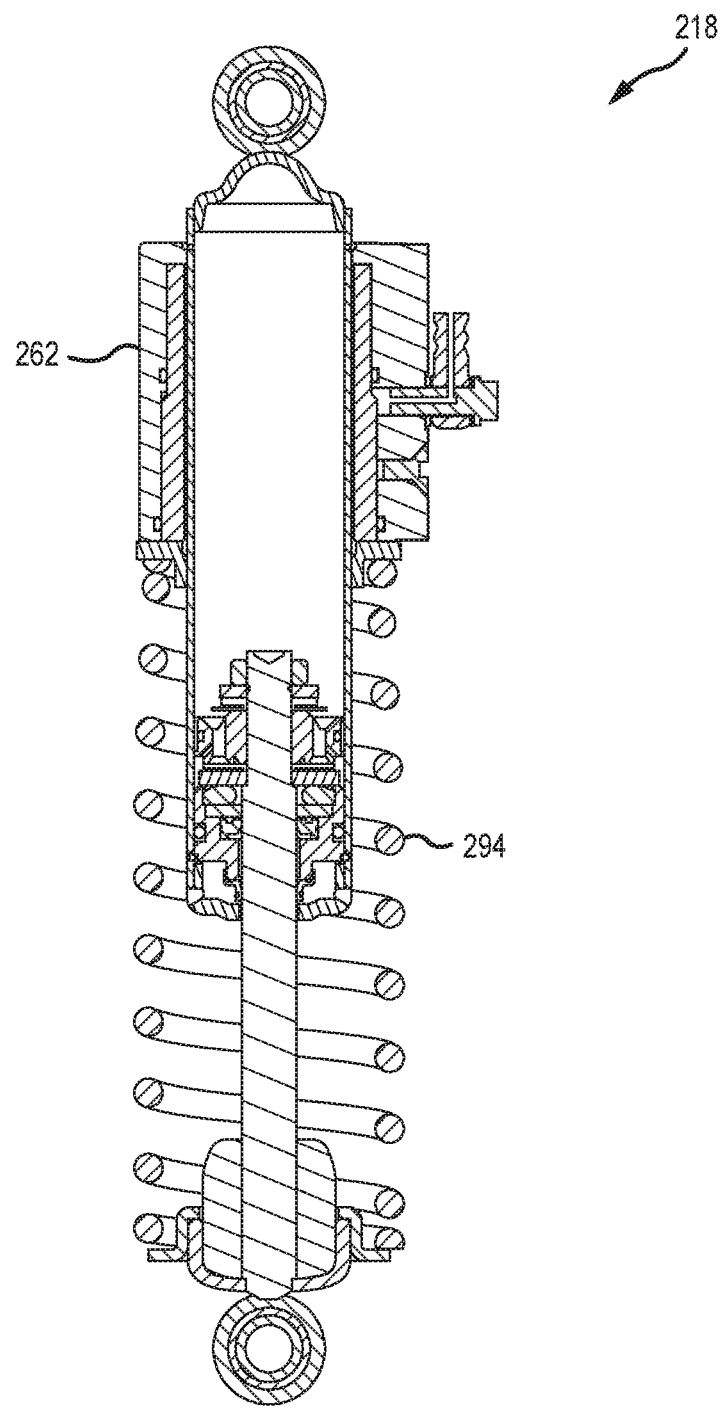
FIG. 8 shows a side sectional view of the suspension damper shown in FIG. 7.

Various views of components included in suspension system 200 are shown in FIGS. 3-7, discussed concurrently below unless otherwise noted. For example, FIGS. 4A through 4F show various views of the exterior of the hydraulic flow adjuster 202. FIG. 4A is a top view of hydraulic flow adjuster 202; FIG. 4B is a rear plan view of hydraulic flow adjuster 202; FIG. 4C is a left plan view of hydraulic flow adjuster 202; FIG. 4D is a bottom plan view of hydraulic flow adjuster 202; FIG. 4E is a front plan view of hydraulic flow adjuster 202; FIG. 4F is a left plan view of hydraulic flow adjuster 202. FIGS. 5A through 5C show a side sectional view of hydraulic flow adjuster 202, wherein hydraulic flow adjuster 202 is in a variety of actuated positions. FIG. 5A shows hydraulic flow adjuster 202 in a first actuated position; FIG. 5B shows hydraulic flow adjuster 202 in a second actuated position, and FIG. 5C shows hydraulic flow adjuster 202 in a third actuated position. FIG. 6 shows an exploded prospective view of hydraulic flow adjuster 202. FIG. 7 shows a front plan view of a suspension damper. FIG. 8 shows a side sectional view of the suspension damper shown in FIG. 7.

Adjuster housing 222 defines various passages and tanks of hydraulic flow adjuster 202. For instance, adjuster housing 222 defines hydraulic tank 204 and hydraulic tank 210. As shown, hydraulic tank 204 and hydraulic tank 210 are substantially cylindrical in shape. A central axis of hydraulic tank 204 is parallel to a central axis of hydraulic tank 210. Each hydraulic tank 204 and 210 includes a fluid outlet 206 and 212, respectively. Sizing of hydraulic tanks 204 and 210 can be varied depending upon each implementation. Considerations for sizing hydraulic tanks 204 and 210 include rider weight loads, ballast, and vehicle size. Adjuster housing has first end 224 opposite adjuster housing second end 226. Adjuster knob 228 positioned proximate to adjuster housing first end 224.

As pistons 208 and 214 move within hydraulic tanks 204 and 210, respectively, hydraulic fluid moves through fluid outlets 206 and 212. Piston 208 and piston 214 typically include o-ring 250 to seal off the piston from each respective hydraulic tank 204, 210. Piston 208 includes piston rod 274 and piston 214 includes piston rod 276.

Piston actuator assembly 216 adjusts relative positioning of piston 208 and piston 214 within their respective hydraulic tanks 204 and 210. Piston actuator assembly 216 is movably connected to adjuster housing 222. Piston actuator assembly 216 includes drive bolt 230, drive bolt seat 232, thrust washer 266, and thrust washer seat 236, and threaded bolt receiving channel 238, to name a few components.

Adjuster knob 228 moves independently from adjuster housing 222. Adjuster knob 228 is actuated with rotational motion and moves along a longitudinal axis of adjuster housing 222. Adjuster knob 228 moves the components of piston actuator assembly 216 along the longitudinal axis of adjuster housing 222. Adjuster knob 228 connects to piston actuator assembly 216 via drive bolt 230. Adjuster housing 222 connects to adjuster knob 228 by interaction of drive bolt 230 in end cap 252.

End cap 252 defines threaded bolt receiving channel 238 that is arranged to receive drive bolt 230. End cap 252 is connected to adjuster housing 222 via set screw 286. Thereby, end cap 252 can be selectively secured to adjuster housing 222 during assembly of hydraulic flow adjuster 202. Stopper ring 290 seats end cap 252 in adjuster housing 222.

End cap 252 can also be configured to provide audial and/or tactile feedback to a user. That is, end cap 252 can be configured to provide a sound and/or vibration indicating each set amount of rotation of adjuster knob 228. For example, end cap 252 can provide a clicking sound every half turn (180° rotation of adjuster knob 228) and/or every full turn (360° rotation of adjuster knob 228). In the embodiment shown, end cap 252 interacts with ball detent and spring 288 to provide such feedback.

Threaded drive bolt 230 passes through threaded bolt receiving channel 238 and connects adjuster knob 228 to piston actuator assembly 216. External threads of threaded bolt receiving channel 238 engage with internal threads of drive bolt 230 such that rotation of adjuster knob 228 moves in a first direction when rotated clockwise and in a second, opposite direction when rotated counterclockwise. Typically, clockwise rotation causes piston actuator assembly 216 to move towards fluid outlets 206, 212 and counterclockwise rotation causes piston actuator assembly 216 to move in a direction away from fluid outlets 206, 212. In the embodiment shown, washer 268 and nut 270 sit on top of adjuster knob 228 and connect adjuster knob 228 to drive bolt 230. Washer 284 and nut 282 secure an opposite end of drive bolt 230 to thrust washer 266.

Drive bolt 230 also defines drive bolt washer seat 232. Drive bolt washer seat 232 provides a seat for thrust washer seat 236. Thrust washer seat 236 provides a seat for thrust washer 266. Thrust washer seat 236 also acts as a stop for preventing adjuster knob 228 from backing all the way out and disengaging from end cap 252.

Thrust washer 266 provides actuating force against pistons 208 and 214. More specifically, thrust washer 266 contacts piston rods 274 and 276. In the embodiment shown, thrust washer 266 contacts, but is not connected to, piston rods 274 and 276. Hydraulic pressure within each tank forces pistons 208 and 214 against thrust washer 266 thereby maintaining contact between thrust washer 266 and pistons 208 and 214.

Thrust washer 266 reduces thrust required to rotate adjuster knob 228. Without being bound by a particular theory, it is believed that thrust washer 266 reduces required thrust by lowering the friction and providing a sliding surface. In some instances, grease is applied to thrust washer 266 to further reduce friction.

Thrust washer 266 can be comprised of a non-metallic material, such as a plastic. In some instances, thrust washer 266 includes multiple layers. For example, a first layer is a Teflon layer and a second layer is a steel material. The multiple layers can be bonded or mated together.

Thrust washer 266 is positioned between thrust washer seat 236 and piston rod guide 272. One or more washers can be positioned between thrust washer 266 and piston rods 274 and 276. As shown, washer 234 is positioned between thrust washer 266 and piston rods 274 and 276. Washer 234 can act as a spacer washer to offset thrust washer 266 from piston rods 274 and 276 and provide a surface over which thrust washer 266 can rotate.

Piston rod guide 272 aligns the pistons 208 and 214. A top surface of piston rod guide 272 sits against surfaces of pistons 208 and 214 adjacent to piston rods 274 and 276. Piston rods 274 and 276 pass through guide channels 278 and 280. Piston rod guide 272 also defines central channel 292. Central channel 292 is sized to allow separating wall 298 between hydraulic tanks 204 and 210 to pass through when piston rod guide 272 is proximate to separating wall 298.

Referring to FIGS. 5A-5C, various operational positions of hydraulic flow adjuster 202 are shown along a cross-section. FIG. 5A shows hydraulic flow adjuster 202 with pistons 208, 214 fully backed out. FIG. 5B shows pistons 208, 214 in an intermediate position. FIG. 5C shows pistons 208, 214 in a fully closed position. FIG. 5C shows a configuration where the separating wall 298 passes through central channel 292 of piston rod guide 272.

As shown in FIGS. 5A-5C, each piston 208, 214 has a relative position within hydraulic tanks 204 and 210, as related to, for instance, a distance from fluid outlets 206, 212. In every operational position, the relative position of piston 208 in hydraulic tank 204 is the same as the relative position of piston 214 in hydraulic tank 210.

Adjuster housing 222 can include graduated scale 246. Graduated scale 246 includes numbers printed at a given interval, such as by fives (i.e., 5, 10, 15, 20, etc.). The numbers correlate to a number of rotations of adjuster knob 228, as indicated by where adjuster knob first edge 248 aligns with the graduated scale 246.

A user can utilize graduated scale 246 to set a desired amount of pre-load in the suspension system. Various pre-load amounts can be correlated to the number of rotations of adjuster knob 228. For example, a manufacturer may recommend 15 rotations for an expected rider weight and ballast of 500 lbs. If the user expects rider weight and ballast to be 500 lbs., the user can rotate adjuster knob 228 until adjuster knob first edge 248 aligns with "15" on graduated scale 246.

Hydraulic fluid flows between hydraulic flow adjuster 202 and suspension dampers 218, 220 via hydraulic fluid lines 258 and 260. More specifically, hydraulic fluid line 258 connects hydraulic tank 204 with suspension damper 218, and hydraulic fluid line 260 connects hydraulic tank 210 with suspension damper 220. Banjo fittings 254, 256 are used to connect the hydraulic tank fluid outlets 206, 212 to hydraulic fluid lines 258 and 260.

Suspension dampers 218 and 220 each include a preload jack 262, 264, respectively. Each preload jack 262, 264 is in communication with, and applies force to, a spring 294, 296. As adjuster knob 228 rotates, fluid enters or exits each preload jack 262, 264 to expand or compress suspension springs 294, 296 against the weight of the vehicle. As springs 294, 296 are compressed, a distance between the two ends of the suspension damper 218 or 220 is increased.

Figure 9:
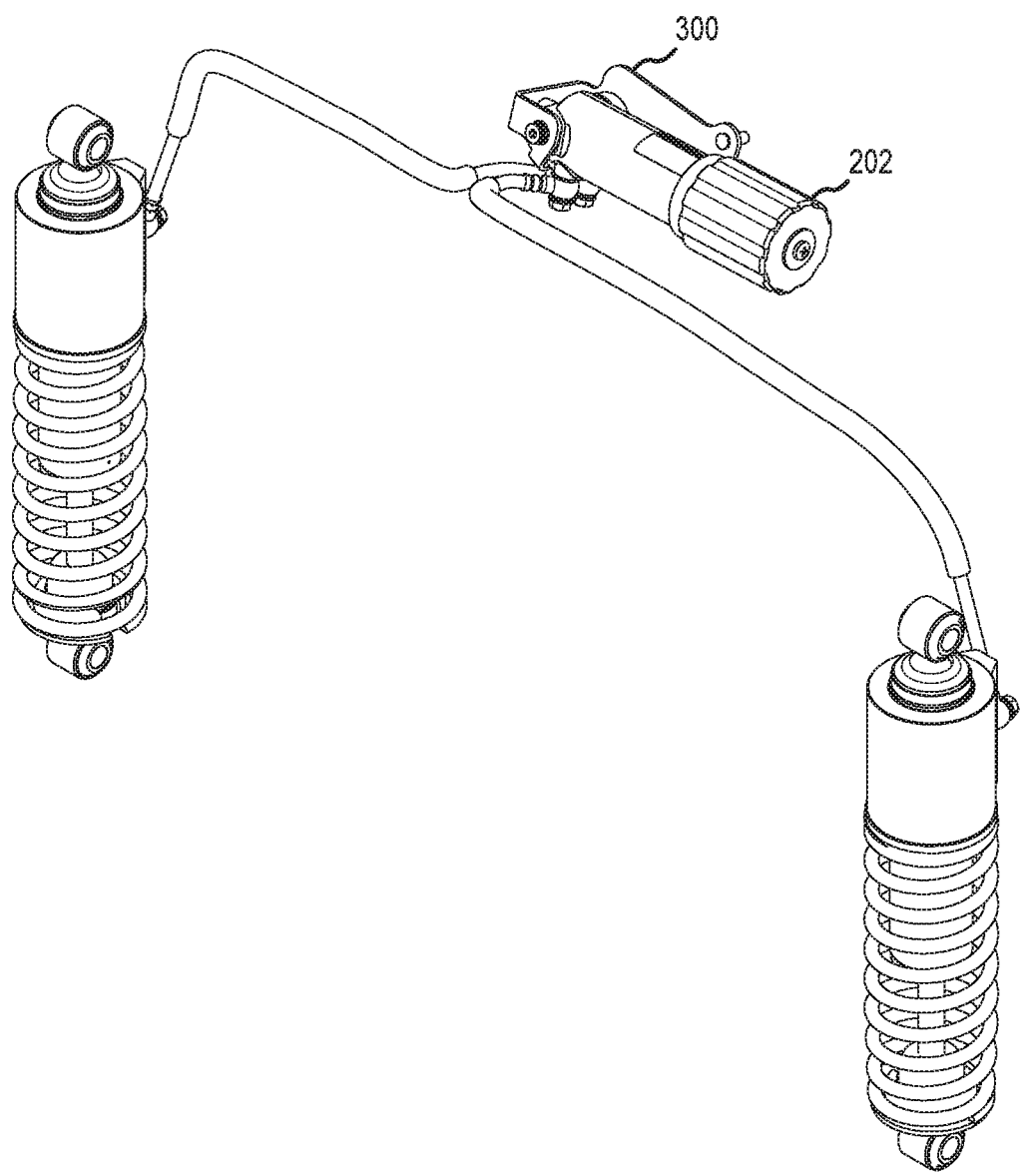
FIG. 9 shows the embodiment of the example suspension system shown in FIG. 3 with a mounting bracket, where the hydraulic flow adjuster is in a stowed orientation.
Figure 10:
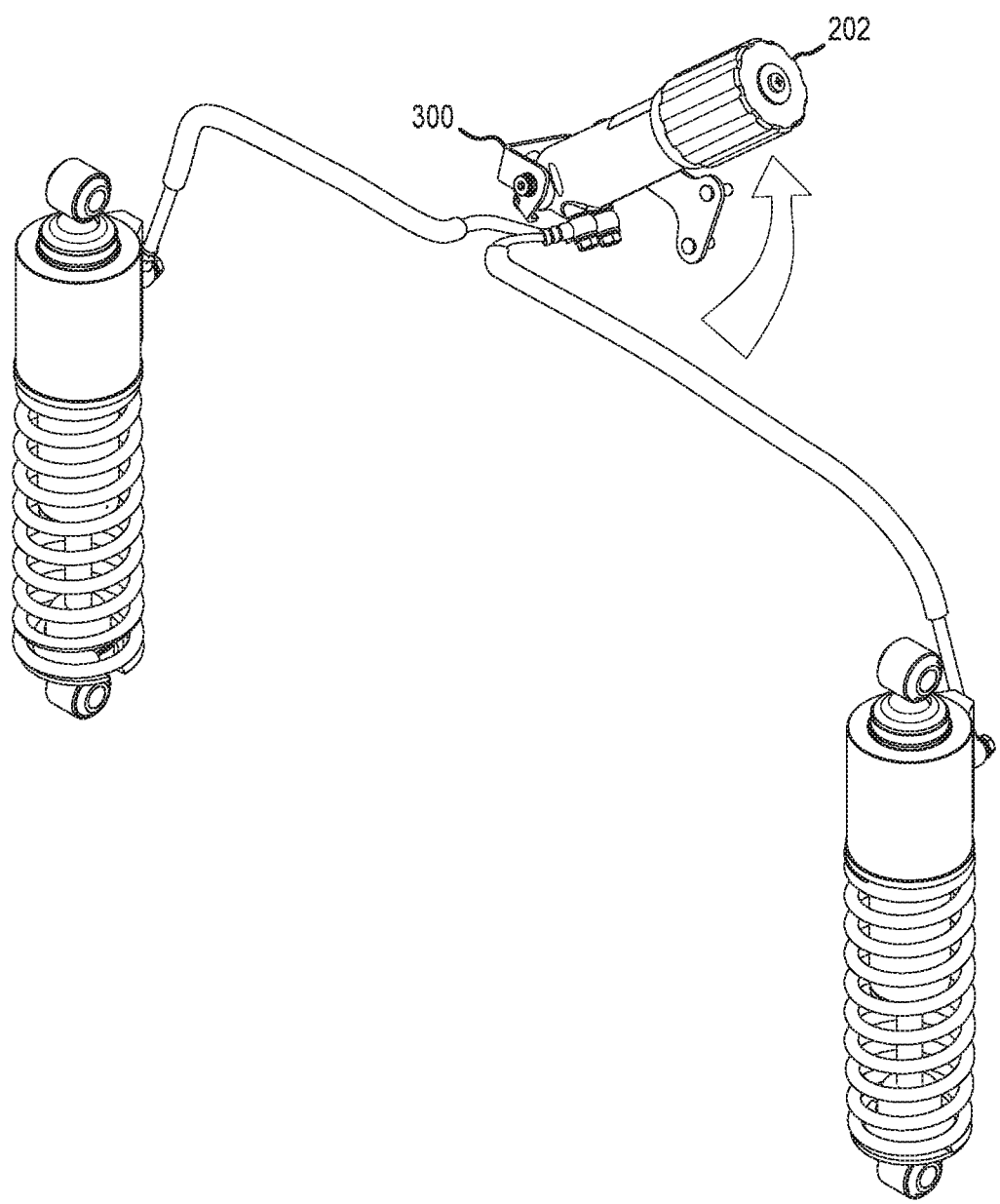
FIG. 10 shows the system of FIG. 9 where hydraulic flow adjuster is in an access orientation.

Hydraulic flow adjuster 202 can be mounted to a vehicle via mounting bracket 300. Mounting bracket 300 enables pivotal movement of hydraulic flow adjuster 202 and can be secured to a portion of the vehicle, such as under a seat. FIG. 9 shows hydraulic flow adjuster 202 in a stowed orientation. FIG. 10 shows hydraulic flow adjuster 202 in an orientation where a user can access and actuate hydraulic flow adjuster 202.

As shown, hydraulic flow adjuster 202 includes adjuster mounting arrangement 240 positioned near adjuster housing first end 224. Adjuster mounting arrangement 240 includes mounting bolt channel 242 and grommet mounting knob 244 defined by adjuster housing 222. Mounting bolt channel 242 provides a pivot axis for moving hydraulic flow adjuster 202 between access and stowed positions. Grommet mounting knob 244 seats in a notch on mounting bracket 300.

What is claimed is:
1. A hydraulic flow adjuster, including:
an adjuster housing;
a first hydraulic tank positioned within the adjuster housing and including a first fluid outlet;

a first piston arranged to operate within the first hydraulic tank;
a second hydraulic tank positioned within the adjuster housing and including a second fluid outlet;
a second piston arranged to operate within the second hydraulic tank;
a guide positioned within the adjuster housing and configured to engage at least a portion of the first piston and at least a portion of the second piston; and
an adjuster knob in communication with the guide and arranged to move independently of the adjuster housing, the adjuster knob arranged to adjust a position of the guide to adjust a relative position of the first piston in the first hydraulic tank and a relative position of the second piston in the second hydraulic tank, such that the relative position of the first piston in the first hydraulic tank is the same as the relative position of the second piston in the second hydraulic tank.

2. The hydraulic flow adjuster according to claim 1, further comprising
a drive bolt connected to the adjuster knob and including a drive bolt washer seat; and
a thrust washer positioned between the drive bolt washer seat and the first piston and the second piston.

3. The hydraulic flow adjuster according to claim 2, the adjuster housing defining a threaded bolt receiving channel arranged to receive a portion of the drive bolt.

4. The hydraulic flow adjuster according to claim 2, wherein the guide is positioned between the thrust washer and upper surfaces of the first piston and the second piston.

5. The hydraulic flow adjuster according to claim 2, further comprising an end cap, the end cap defining a threaded bolt receiving channel configured to receive the drive bolt;
wherein the end cap is secured to the adjuster housing; and
wherein the end cap is configured to provide rotational feedback to a user.

6. The hydraulic flow adjuster according to claim 2, wherein the thrust washer includes a polymer layer and a steel layer.

7. The hydraulic flow adjuster according to claim 1, the adjuster housing further comprising a graduated scale, wherein interaction between the graduated scale and a first edge of the adjuster knob indicates adjuster knob rotation.

8. A suspension system including:
a hydraulic flow adjuster including:
an adjuster housing;
a first hydraulic tank positioned within the adjuster housing and including a first fluid outlet;
a first piston arranged to operate within the first hydraulic tank;
a second hydraulic tank positioned within the adjuster housing and including a second fluid outlet;
a second piston arranged to operate within the second hydraulic tank;
a guide positioned within the adjuster housing and configured to engage at least a portion of the first piston and at least a portion of the second piston; and
an adjuster knob in communication with the guide and arranged to move independently of the adjuster housing, the adjuster knob arranged to adjust a position of the guide to adjust a relative position of the first piston in the first hydraulic tank and a relative position of the second piston in the second hydraulic tank, such that the relative position of the first piston in the first hydraulic tank is the same as the relative position of the second piston in the second hydraulic tank;
a first suspension damper including a first preload jack, the first preload jack being in fluid communication with the first fluid outlet; and
a second suspension damper including a second preload jack, the second preload jack being in fluid communication with the second fluid outlet.

9. The suspension system according to claim 8, further comprising
a drive bolt connected to the adjuster knob and including a drive bolt washer seat; and
a thrust washer positioned between the drive bolt washer seat and the first piston and the second piston.

10. The suspension system according to claim 9, the adjuster housing defining a threaded bolt receiving channel arranged to receive a portion of the drive bolt; and
wherein rotation of the adjuster knob selectively positions the first piston and the second piston.

11. The suspension system according to claim 10, further comprising a washer positioned between the thrust washer and the first piston and the second piston.

12. The suspension system according to claim 8, the adjuster housing further comprising an adjuster mounting arrangement positioned on a first housing end, wherein the adjuster knob is positioned on a second housing end opposite the first housing end.

13. The suspension system according to claim 12, the adjuster mounting arrangement defining a mounting bolt channel and a grommet mounting knob.

14. The suspension system according to claim 8, the adjuster housing further comprising a graduated scale, wherein interaction between the graduated scale and a first edge of the adjuster knob indicates adjuster knob rotation.

15. The suspension system according to claim 8, wherein a first banjo fitting connects the first fluid outlet and a first hydraulic fluid line, the first hydraulic fluid line connecting to the first suspension damper; and
wherein a second banjo fitting connects the second fluid outlet and a second hydraulic fluid line, the second hydraulic fluid line connecting to the second suspension damper.

16. A vehicle including:
a left suspension damper having a left preload jack;
a right suspension damper having a right preload jack; and
a hydraulic flow adjuster including:
an adjuster housing;
a first hydraulic tank positioned within the adjuster housing and including a first fluid outlet, the first fluid outlet being in fluid communication with the left preload jack;
a first piston arranged to operate within the first hydraulic tank;
a second hydraulic tank positioned within the adjuster housing and including a second fluid outlet, the second fluid outlet being in fluid communication with the right preload jack;
a second piston arranged to operate within the second hydraulic tank;
a guide positioned within the adjuster housing and configured to engage at least a portion of the first piston and at least a portion of the second piston; and
an adjuster knob in communication with the guide and arranged to move independently of the adjuster housing, the adjuster knob arranged to adjust a position of the guide to adjust a relative position of the first piston in the first hydraulic tank and a relative position of the second piston in the second hydraulic tank, such that the relative position of the first piston in the first hydraulic tank is the same as the relative position of the second piston in the second hydraulic tank.

17. The vehicle according to claim 16, wherein the hydraulic flow adjuster further includes:
   a drive bolt connected to the adjuster knob and including a drive bolt washer seat; and
   a thrust washer positioned between the drive bolt washer seat and the first piston and the second piston.

18. The vehicle according to claim 17, wherein the guide is positioned between the thrust washer and upper surfaces of the first piston and the second piston, and wherein the hydraulic flow adjuster further includes:
   an end cap, the end cap defining a threaded bolt receiving channel configured to receive the drive bolt,
   wherein the end cap is secured to the adjuster housing;
   wherein the end cap is configured to provide rotational feedback to a user; and
   wherein the adjuster housing further comprises a graduated scale, wherein interaction between the graduated scale and a first edge of the adjuster knob indicates adjuster knob rotation.

\* \* \* \* \*